(12) United States Patent
Yamashita et al.

(10) Patent No.: US 11,460,869 B2
(45) Date of Patent: Oct. 4, 2022

(54) FLUID CONTROL SYSTEM AND FLOW RATE MEASUREMENT METHOD

(71) Applicant: FUJIKIN INCORPORATED, Osaka (JP)

(72) Inventors: Satoru Yamashita, Osaka (JP); Yohei Sawada, Osaka (JP); Masaaki Nagase, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 291 days.

(21) Appl. No.: 16/634,603

(22) PCT Filed: Jul. 24, 2018

(86) PCT No.: PCT/JP2018/027755
§ 371 (c)(1),
(2) Date: Jan. 28, 2020

(87) PCT Pub. No.: WO2019/026700
PCT Pub. Date: Feb. 7, 2019

(65) Prior Publication Data
US 2020/0159257 A1    May 21, 2020

(30) Foreign Application Priority Data
Jul. 31, 2017    (JP) .............................. JP2017-148264

(51) Int. Cl.
*F17D 1/00*    (2006.01)
*G05D 7/06*    (2006.01)

(52) U.S. Cl.
CPC .................... *G05D 7/0658* (2013.01)

(58) Field of Classification Search
CPC ..... G05D 7/0658; G05D 7/0635; G01F 1/363
See application file for complete search history.

(56) References Cited

U.S. PATENT DOCUMENTS

| | | | |
|---|---|---|---|
| 6,193,212 B1 | 2/2001 | Ohmi et al. | |
| 10,054,959 B2* | 8/2018 | Somani | ............... G01F 15/005 |
| 2004/0144178 A1* | 7/2004 | Ohmi | ...................... G01F 1/50 |
| | | | 73/708 |

(Continued)

FOREIGN PATENT DOCUMENTS

| | | |
|---|---|---|
| JP | 2006337346 A | 12/2006 |
| KR | 10-2007-0110499 A | 11/2007 |

(Continued)

OTHER PUBLICATIONS

International Search Report issued in PCT/JP2018/027755; dated Oct. 9, 2018.

*Primary Examiner* — Reinaldo Sanchez-Medina
(74) *Attorney, Agent, or Firm* — Studebaker & Brackett PC (57) ABSTRACT

A fluid control system (1) comprises: a first valve (21) provided downstream of a flow rate controller (10), a flow rate measuring device (30) provided downstream of the first valve (21) and having a second valve (22), an open/close detector (26) provided to the second valve (22), and a controller (25) for controlling an open/close operation of the first valve (21) and the second valve (22), and the controller (25) controls the open/close operation of the first valve (21) in response to a signal output from the open/close detector (26).

6 Claims, 4 Drawing Sheets

(56) References Cited

U.S. PATENT DOCUMENTS

| | | | |
|---|---|---|---|
| 2010/0139775 A1 | 6/2010 | Ohmi et al. | |
| 2010/0229967 A1* | 9/2010 | Yasuda | G01F 25/10 137/486 |
| 2013/0186471 A1* | 7/2013 | Nagase | G05D 7/0652 702/47 |
| 2014/0083613 A1 | 3/2014 | Xu et al. | |
| 2014/0373935 A1* | 12/2014 | Nishino | G05D 7/0641 137/102 |
| 2015/0136248 A1 | 5/2015 | Nagase et al. | |
| 2015/0260565 A1* | 9/2015 | Smirnov | G01F 25/0007 73/1.34 |
| 2017/0364099 A1 | 12/2017 | Nagase et al. | |
| 2018/0246532 A1* | 8/2018 | Nakamura | G05D 7/0635 |
| 2019/0017855 A1* | 1/2019 | Sawada | G01F 1/50 |

FOREIGN PATENT DOCUMENTS

| | | |
|---|---|---|
| TW | 506498 U | 10/2002 |
| TW | 201419404 A | 5/2014 |
| TW | M528413 U | 9/2016 |
| WO | 2013179550 A1 | 12/2013 |

\* cited by examiner

FLUID CONTROL SYSTEM AND FLOW RATE MEASUREMENT METHOD

TECHNICAL FIELD

The present invention relates to a fluid control system and a flow rate measuring method, and more particularly, to a fluid control system comprising a flow rate measuring device connected to a downstream side of a flow rate controller, and a flow rate measuring method using the fluid control system.

BACKGROUND OF INVENTION

A gas supply system provided in a semiconductor manufacturing device or the like is generally configured to switch and supply various type of gas to a gas consumption part such as a process chamber via a flow rate controller provided for each type of suppled gas.

In an operation of the flow rate controller, it is desired to check the flow rate accuracy and calibrate the flow rate at any time, and as a flow rate measurement method, a build-up method is sometimes used for the flow rate accuracy checking and the flow rate calibration. The build-up method is a method of flow rate measuring by detecting an amount of fluid per unit time flowing into a known build-up capacity.

In the build-up method, for example, by flowing a gas to a predetermined build-up capacity (V) provided downstream of the flow rate controller when a downstream valve is closed, and measuring a pressure increase rate ($\Delta P/\Delta t$) and a temperature (T) at that time, the flow rate Q can be obtained by calculation from $Q=22.4(\Delta P/\Delta t) \times V/RT$ (R is a gas constant).

Patent Document 1 discloses an example of flow rate measurement using the build-up method. In the gas supply device described in Patent Document 1, a plurality of gas supply lines are provided, and a flow path from an on-off valve downstream of a flow rate controller connected to each gas supply line to an on-off valve provided in a common gas supply path is used as a build-up capacity. In addition, Patent Document 2 discloses an example of flow rate measurement by a build-down method.

PRIOR-ART DOCUMENTS

Patent Literatures

Patent Document 1: Japanese Laid-Open Patent Application No. 2006-337346
Patent Document 2: International Patent Publication No. 2013/179550

SUMMARY OF INVENTION

Problems to be Solved by Invention

However, particularly when the gas flow path is used as the build-up capacity as described above, the reference volume is relatively small and the measurement time of the pressure rise is relatively short, so that the measurement accuracy of the flow rate measurement may be lowered.

The present invention has been made in view of the above problems, and its main object is to provide a fluid control system capable of performing flow rate measurement with improved accuracy.

Means for Solving Problem

A fluid control system according to an embodiment of the present invention comprises a first valve provided downstream of a flow rate controller, a flow rate measuring device provided downstream of the first valve and having a second valve, an open/close detector provided to the second valve, and a controller for controlling open/close operation of the first valve and the second valve, and controls opening/closing of the first valve according to a signal output from the open/close detector.

In an embodiment, the controller controls a timing of an open/close command output to the first valve based on the opening/closing of the second valve detected by a signal output from the open/close detector.

In an embodiment, the flow rate measuring device further comprises a pressure sensor disposed upstream of the second valve, and is configured to use the pressure sensor to measure a pressure rise inside a flow path after closing the second valve, and a start point of the pressure rise is determined on the basis of a signal output by the open/close detector.

In an embodiment, the fluid control system includes a plurality of first flow paths each having the flow rate controller and the first valve, a second flow path commonly connected to a downstream side of the plurality of first flow paths, and for supplying a fluid whose flow rate is controlled by the flow rate controller to a consumption part, and a third flow path provided to branch from the second flow path and having the flow rate measuring device.

In an embodiment, the flow rate controller is a pressure-type flow rate controller comprising a control valve, a restriction part, and an upstream pressure sensor for measuring a pressure upstream of the restriction part.

A flow rate measuring method according to an embodiment of the present invention is a flow rate measuring method performed in a fluid control system comprising: a first valve provided downstream of a flow rate controller; a flow rate measuring device provided downstream of the first valve and having a pressure sensor, a temperature sensor, and a second valve; an open/close detector provided on the second valve; and a controller for controlling open/close operation of the first valve and the second valve, wherein the method includes a first step of opening the first valve and the second valve to flow gas, and closing the second valve when gas is flowing, then closing the first valve after a build-up time elapses from the time when the second valve is closed; a second step of opening the first valve and the second valve to flow gas, and simultaneously closing the first valve and the second valve when gas is flowing, then measuring a pressure and a temperature using the pressure sensor and the temperature sensor after the first valve and the second valve are closed; and a third step of calculating a flow rate based on the pressure and temperature measured in the first step and the pressure and temperature measured in the second step, wherein in the first step, a time point of closing the second valve is determined based on an output from the open/close detector, while in the second step, a timing of an open/close command output to the first valve is controlled in response to a signal output from the open/close detector when an operation of simultaneously closing the first valve and the second valve is performed.

In an embodiment, the third step includes a step of calculating a flow rate Q according to $Q=22.4 \cdot V_s \cdot (P_A/T_A - P_B/T_B)/(R \cdot \Delta t)$ (where $V_s$ is a build-up capacity, R is a gas constant, $\Delta t$ is the build-up time from closing the second valve to closing the first valve in the first step) using the pressure $P_A$ and the temperature $T_A$ measured in the first step and the pressure $P_B$ and the temperature $T_B$ measured in the second step.

Effect of Invention

According to the embodiments of the present invention, the flow rate measurement can be appropriately performed.

DETAILED DESCRIPTION OF INVENTION

Embodiments of the present invention will be described below with reference to the drawings, but the present invention is not limited to the following embodiments.

Figure 1:
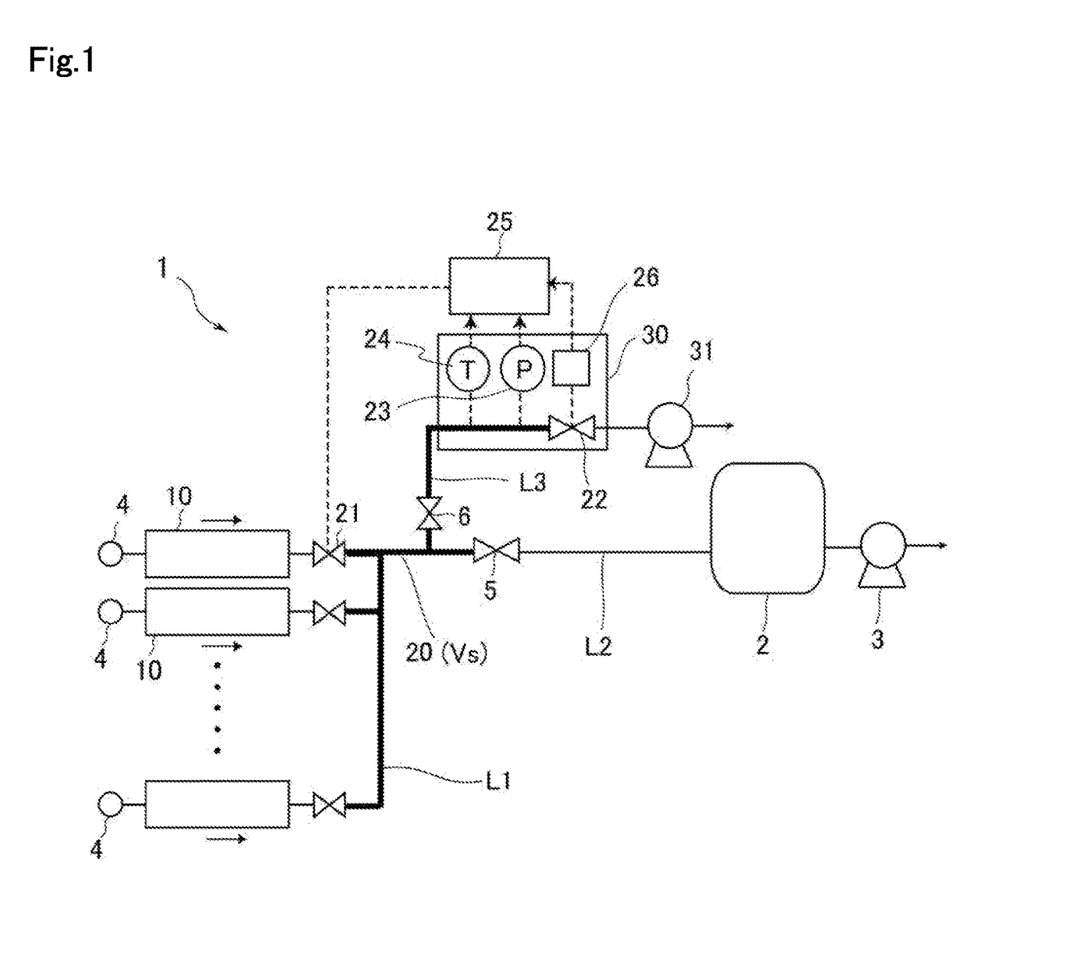
FIG. 1 is a schematic diagram showing a fluid control system according to an embodiment of the present invention.

FIG. 1 shows a fluid control system 1 according to an embodiment of the present invention. The fluid control system 1 is configured to supply gas from a gas supply source 4 to a gas consumption part such as a process chamber 2 of a semiconductor manufacturing device at a controlled flow rate.

The fluid control system 1 has a plurality of first flow paths L1 each connected to a different gas supply source 4, a second flow path L2 and a third flow path L3 downstream of the first flow path L1. Each of the first flow paths L1 is provided with a flow rate controller 10 and a first valve 21 disposed downstream of a flow rate controller 10. The flow rate controller 10 and the first valve 21 provided in each of the first flow paths L1 may be integrally provided in one flow rate controller (gas box).

The second flow path L2 for supplying a gas having a flow rate controlled by the flow rate controller 10 to a process chamber 2 is connected to the downstream side of the first flow path L1. The second flow path L2 is provided in common to the plurality of first flow paths L1, and the gas from any of the first flow paths L1 is supplied to the process chamber 2 through the second flow path L2.

A vacuum pump 3 is connected to the process chamber 2 provided in the second flow path L2, and gas from the gas supply source 4 is typically supplied to the process chamber 2 through the flow rate controller 10 in a state where the flow path is depressurized by operating the vacuum pump 3. A shut-off valve 5 is provided in the second flow path L2, and the flow of gas to the process chamber 2 can be shut off as necessary.

In addition, the third flow path L3 is provided downstream of the first flow path L1 so as to branch from the second flow path L2. Like the second flow path L2, the third flow path L3 is also provided in common to the plurality of the first flow paths L1.

The third flow path L3 is provided with an upstream side shutoff valve 6 and a flow rate measuring device 30, and a downstream side of the flow rate measuring device 30 is connected to a vacuum pump 31. In the fluid control system 1 of the present embodiment, the flow rate measurement can be performed by selectively flowing gas through the flow rate measurement device 30 of the third flow path L3 in a state where the shutoff valve 5 of the second flow path L2 is closed and the shutoff valve 6 of the third flow path L3 is open.

Figure 2:
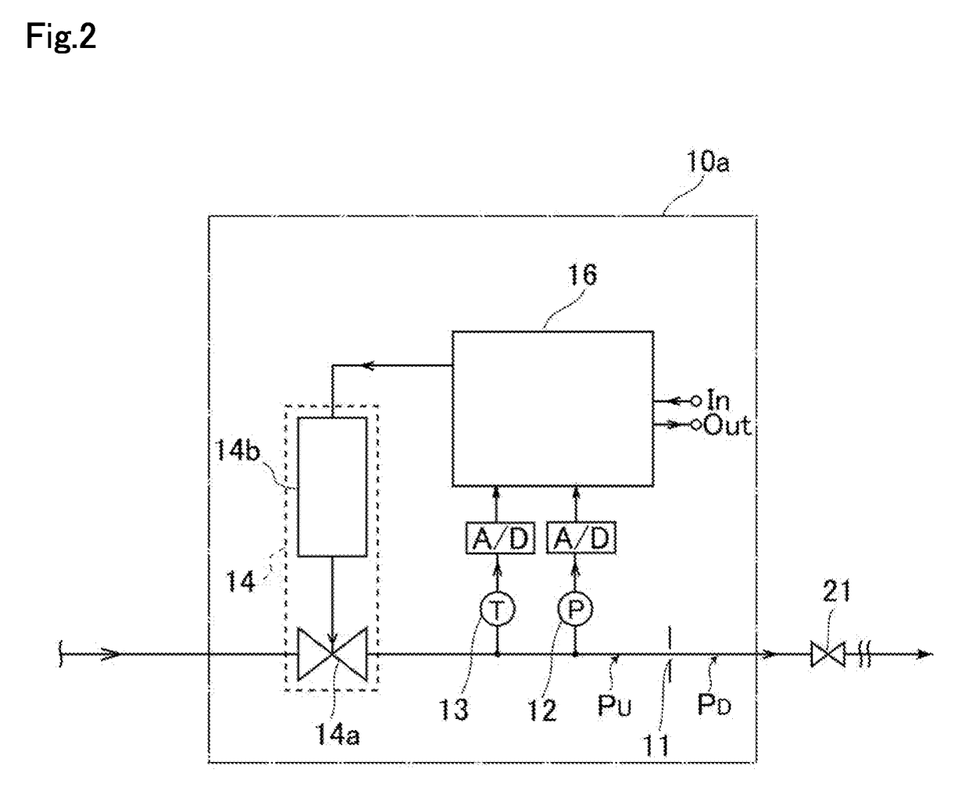
FIG. 2 is a diagram showing an exemplary configuration of a pressure type flow rate control device used in an embodiment of the present invention.

In the fluid control system 1 of the present embodiment, each flow rate controller 10 provided in the first flow path L1 may be a pressure type flow rate controller 10a as shown in FIG. 2. The pressure type flow rate control device 10a includes a restriction part 11 having a fine opening (orifice), a control valve 14 (valve 14a and its driving unit 14b) provided upstream of the restriction part 11, a pressure sensor (upstream pressure sensor) 12 and a temperature sensor 13 provided between the restriction part 11 and the control valve 14. As the restriction part 11, a critical nozzle or a sonic nozzle may be used other than an orifice member such as an orifice plate. The aperture diameter of the orifice or the nozzle is set to, for example, 10 μm to 500 μm. In addition, as the control valve 14, for example, a piezo element-driven control valve in which a metallic diaphragm valve (valve 14a) is driven by a piezo actuator (driving unit 14b) may be used.

The pressure sensor 12 and the temperature sensor 13 are connected to a control circuit 16 via an AD converter. The control circuit 16 is also connected to the driving unit 14b of the control valve 14, and generates a control signal based on outputs from the pressure sensor 12 and the temperature sensor 13, and controls the operation of the control valve 14 by the control signal. In the present embodiment, the control circuit 16 is provided in each pressure type flow rate control device 10a, but in other aspects, the control circuit 16 may be provided outside in common to a plurality of pressure type flow rate control devices 10a. The AD converter may be built inside the control circuit 16.

The pressure-type flow control device 10a performs flow control using the principle that when the critical expansion condition $P_U/P_D \geq$ about 2 ($P_U$: gas pressure (upstream pressure) on the upstream side of the restriction part, $P_D$: gas pressure (downstream pressure) on the downstream side of the restriction part, and about 2 is nitrogen gas) is satisfied, the flow rate of the gas passing through the restriction part is fixed to the sonic velocity, and the flow rate is determined by the upstream pressure $P_U$ regardless of the downstream pressure $P_D$. When the critical expansion condition is satisfied, the flow rate Q downstream of the restriction part is given by $Q=K_1 \cdot P_U$, where $K_1$ is a constant depending on the fluid type and the fluid temperature, and the flow rate Q is proportional to the upstream pressure $P_U$ measured by the upstream pressure sensor 12. In another embodiment, when a downstream pressure sensor (not shown) is provided downstream of the restriction part 11, the flow rate can be calculated even when the difference between the upstream pressure $P_U$ and the downstream pressure $P_D$ is small and the critical expansion condition is not satisfied, and the flow rate Q can be calculated from a predetermined equation $Q=K_2 \cdot P_D^m (P_U-P_D)^n$ (where $K_2$ is a constant depending on the fluid type and the fluid temperature, and m and n are indexes derived from the actual flow rate) based on the upstream pressure $P_U$ and the downstream pressure $P_D$ measured by each pressure sensor.

In order to perform flow rate control, the set flow rate is input to the control circuit 16, and the control circuit 16 obtains the flow rate from the above $Q=K_1 \cdot P_U$ or $Q=K_2 \cdot P_D^m (P_U-P_D)^n$ by calculation based on the output (upstream pressure $P_U$) of the pressure sensor 12 or the like, and feedback-controls the control valve 14 so that the flow rate approaches the input target flow rate. The flow rate obtained by the calculation may be displayed as a flow rate output value.

However, in the fluid control system 1 of the present embodiment, the one used as the flow rate controller 10 is not limited to the pressure type flow rate controller 10a of this type, and may be, for example, a thermal type flow rate controller or other types of flow rate controllers.

Reference is again made to FIG. 1. As described above, the flow rate measuring device 30 is provided in the third flow path L3. The flow rate measuring device 30 is disposed in the third flow path L3 branched from the second flow path L2 leading to the process chamber 2, but in another embodiment, the flow rate measuring device 30 may be provided so as to be interposed in the middle of the second flow path L2. In addition, the vacuum pump 31 provided downstream of the flow rate measuring device 30 may also serve as the vacuum pump 3 provided downstream of the second flow path L2. The flow measuring device 30 can be arranged in various manners as long as it is provided so as to communicate with the downstream side of the flow rate controller 10.

As shown in FIG. 1, the flow rate measuring device 30 of the present embodiment includes a second valve 22, a pressure sensor 23, and a temperature sensor 24. The pressure sensor 23 and the temperature sensor 24 are provided in the vicinity of the upstream side of the second valve 22, and can measure the pressure and the temperature of the flow path between the first valve 21 and the second valve 22.

The flow rate measuring device 30 further includes an open/close detector 26 for detecting an actual opening/closing operation of the second valve 22. As the open/close detector 26, various sensors such as a position sensor capable of detecting a movement of a valve element of the second valve 22 can be used. When an AOV, which will be described later, is used as the second valve 22, a displacement meter for measuring a position of a piston moving in conjunction with the valve element, a limit switch for detecting a vertical movement of a stem or the like can be used as the open/close detector 26. The open/close detector 26 may be provided in various manners as long as it can immediately detect the actual open/close state of the second valve 22.

The fluid control system 1 includes a controller 25, and output signals from the pressure sensor 23 and the temperature sensor 24 of the flow rate measuring device 30 and output signals from the open/close detector 26 are input to the controller 25. The controller 25 may be provided integrally with the pressure sensor 23, the temperature sensor 24, and the second valve 22, or may be a processing device provided outside.

In the present embodiment, the controller 25 is connected to the first valve 21 and the second valve 22 so as to be able to control the operation of the first valve 21 and the second valve 22. However, in other embodiments, the operations of the first valve 21 and the second valve 22 may be controlled by a controller provided separately from the controller 25.

The controller 25 typically includes parts or all of a CPU, a memory (storage device) M such as a ROM or a RAM, an A/D converter, and the like, and may include a computer program configured to execute a flow rate measurement operation described later, and may be realized by a combination of hardware and software. The controller 25 may be provided with an interface for exchanging information with an external device such as a computer, so that programs and data can be written from the external device to the ROM.

As the first valve 21 and the second valve 22, an on-off valve (shutoff valve) is used, for example, a fluid-driven valve such as an AOV (Air Operated Valve), or an electrically operated valve such as a solenoid valve or an motor valve is used. In another embodiment, the first valve 21 may be built into the flow rate controller 10.

However, in the present embodiment, the first valve 21 and the second valve 22 are of different types, more specifically, a smaller valve is used as the first valve 21, and a larger valve (for example, a ⅜ inch valve) is used as the second valve 22. As a result, the responsiveness of the second valve 22 is lower than the responsiveness of the first valve 21.

Moreover, when AOVs are used as the first valve 21 and the second valve 22, a difference in the responsiveness of the valves also occurs depending on the design of the AOVs. The AOV comprises, for example, a valve mechanism including a valve element interposed in a flow path, and a pneumatic line tube connected to the valve mechanism, and the valve can be closed by feeding compressed air from a compressor to the pneumatic line tube via a regulator or the like.

When the AOVs are used, the driving speed of the valves may vary depending on a supply pressure (operation pressure) of the air supplied to the valve mechanism, thus a difference in responsiveness between the first valve 21 and the second valve 22 may occur. In addition, the responsiveness of the AOVs also changes depending on the length of the pneumatic line tube, and the longer the tube, the lower the responsiveness.

Therefore, for example, even if the first valve 21 and the second valve 22 are simultaneously commanded to close, the first valve 21 may actually close earlier than the second valve 22. When the second valve 22 having low responsiveness is used, the second valve 22 is actually closed with a delay from the time when the close command is issued. Therefore, if the time when the close command is issued is regarded as the time when the second valve 22 is closed, a temporal error may occur, and may cause a deterioration in the flow rate measurement accuracy.

Therefore, in the fluid control system 1 of the present embodiment, the actual opening/closing of the second valve 22 is detected on the basis of a signal output from the open/close detector 26, so that the opening/closing time of the second valve 22 can be specified more accurately. This makes it possible to perform the flow rate measurement with improved accuracy compared with the conventional method, for example, when performing the flow rate measurement by the build-up method, as described below.

Hereinafter, the flow rate measurement method by the build-up method according to the present embodiment will be described in detail.

In this flow rate measuring method, a flow path (a portion indicated by a thick line in FIG. 1) between the first valve 21 and the second valve 22 can be used as a build-up capacity 20 (volume: Vs). In this manner, by using a part of the flow path as the build-up capacity without separately providing the build-up tank, it is possible to realize miniaturization and cost reduction of the flow rate measuring device 30, and it is possible to obtain an advantage that the flow rate can be measured in a short time.

Note that the flow rate control characteristic of the flow rate controller 10 may change after being incorporated in the fluid control system 1, or the relationship between the upstream pressure and the flow rate may change due to a change in the shape of the restriction part caused by long-term use. On the contrary, according to the fluid control system 1, since the flow rate can be measured by the build-up method using the flow rate measuring device 30 with an improved accuracy at an arbitrary point of time, the accuracy of the flow rate controller 10 can be guaranteed over a long period of time.

Figure 3:
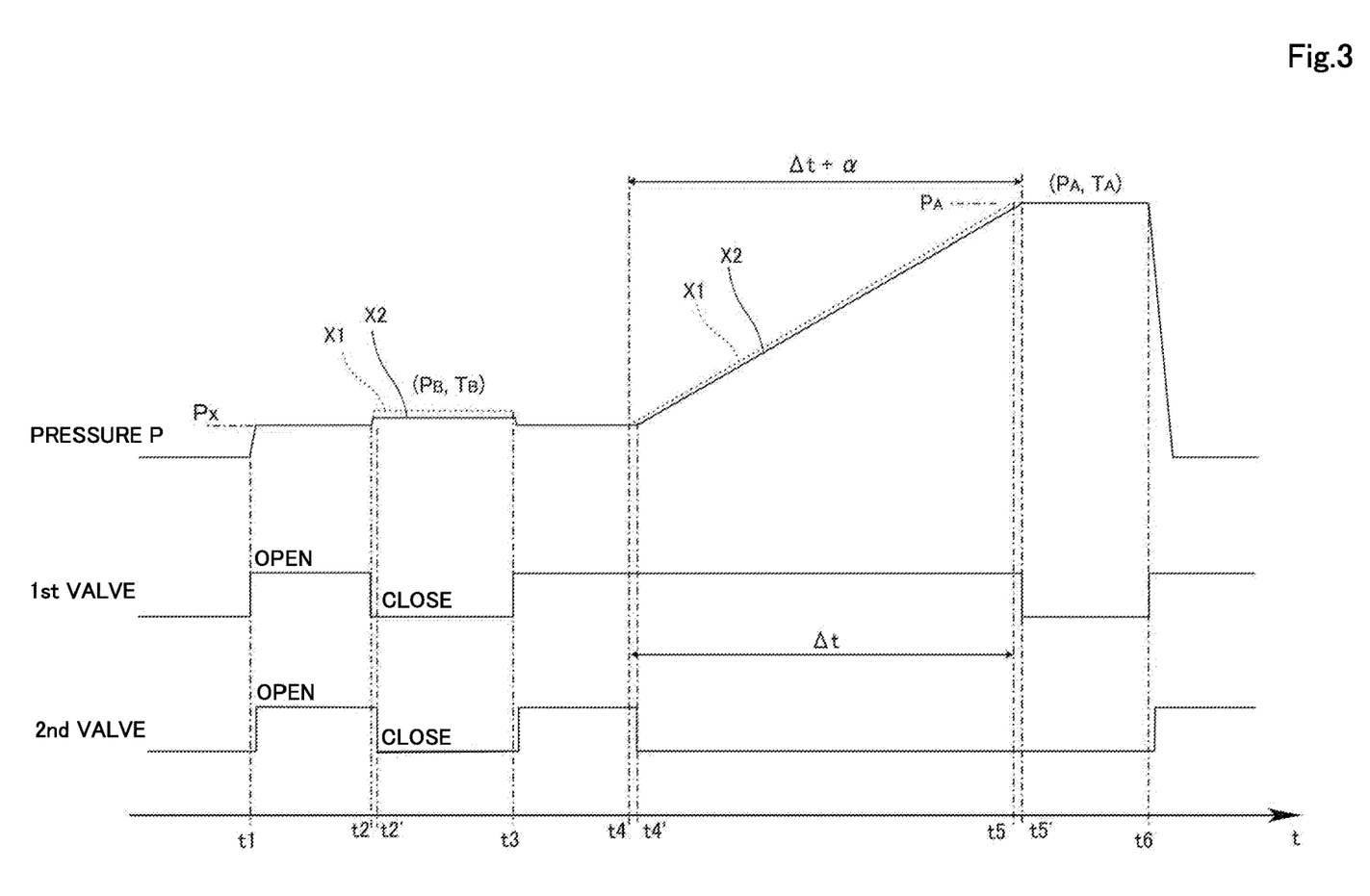
FIG. 3 is a diagram showing a valve operation sequence and the like of the flow rate measurement in a comparative embodiment.
Figure 4:
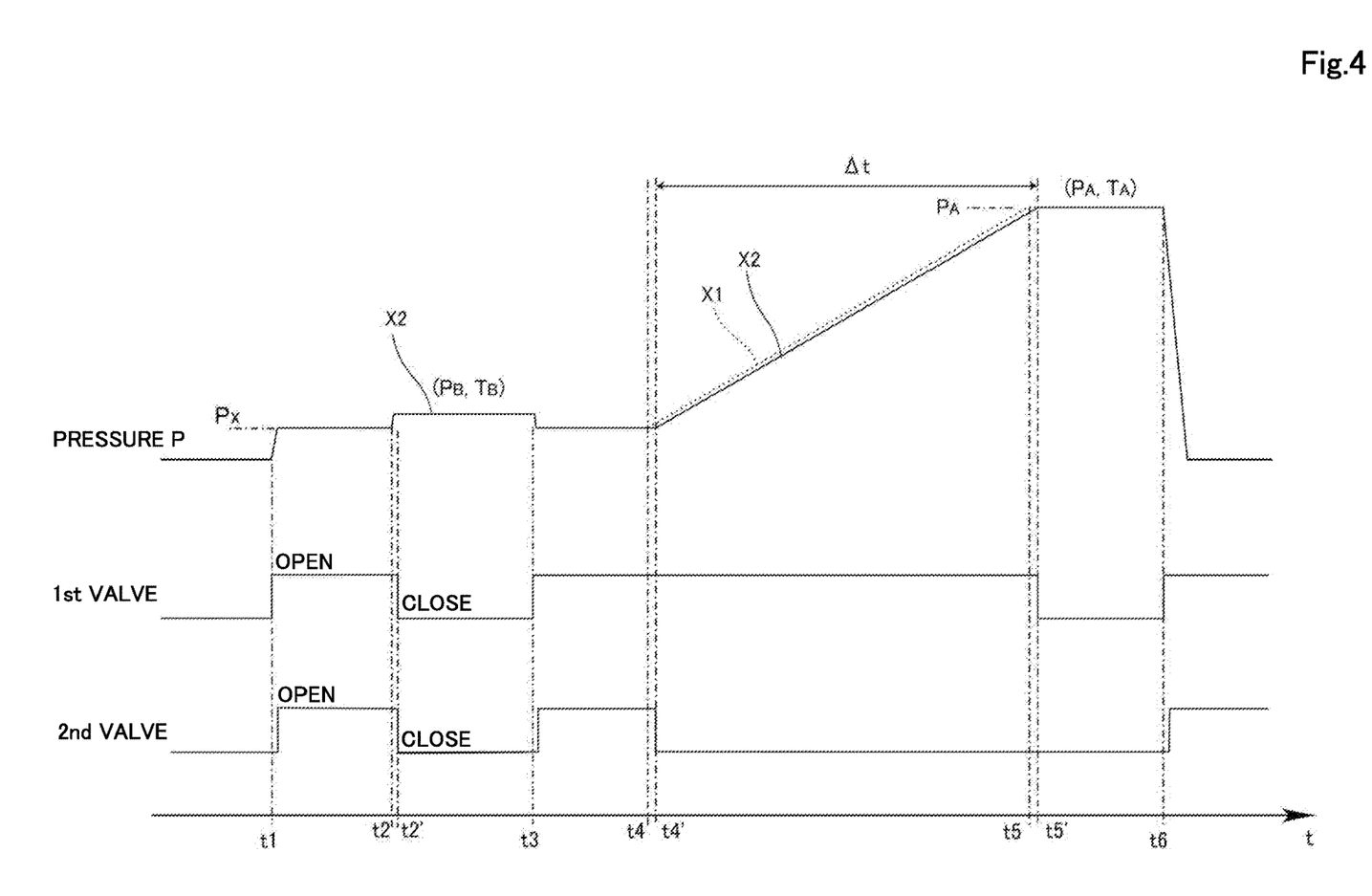
FIG. 4 is a diagram showing a valve operation sequence and the like of the flow rate measurement in an embodiment.

FIGS. 3 and 4 are diagrams showing an exemplary embodiment of a valve operation sequence (open/close timing of the first valve 21 and the second valve 22) at the time of measuring the flow rate by the build-up method and a pressure P output by the pressure sensor 23 of the flow rate measuring device 30. FIG. 3 shows a comparative embodiment without the open/close detector 26, and FIG. 4 shows an embodiment using the open/close detector 26.

As shown in the comparative embodiment of FIG. 3 and in the embodiment of FIG. 4, the flow rate measurement is started, for example, from a state where the first valve 21 and the second valve 22 are closed. At this time, the on-off valve 5 of the second flow path L2 shown in FIG. 1 is closed, the on-off valve 6 of the third flow path is opened, and the gas from the first flow path L1 is selectively flowed to the third flow path L3.

Next, in the first flow path L1 which is the flow rate measurement target, the set flow rate of the flow rate controller 10 is set to an arbitrary flow rate, for example, a 50% flow rate when the maximum flow rate is 100%, and at time t1, the corresponding first valve 21 is opened. Note that the first valves 21 of the other first flow paths L1 than the flow rate measurement target are maintained in a closed state, and in the present embodiment, the flow rate measurement is performed for one first flow path L1 at a time.

In addition, at the time t1, an open command is also issued to the second valve 22, whereby the gas flows in the second flow path L2 at the set flow rate. At this time, the measured pressure P of the pressure sensor 23 becomes a pressure Px having a magnitude corresponding to the set flow rate.

However, at this time, since the responsiveness of the second valve 22 is low as shown in FIGS. 3 and 4, even if an open command is actually issued to the first valve 21 and the second valve 22 at the time t1, the second valve 22 opens slightly later than the time t1. In the present comparative embodiment and the present embodiment, as the first valve 21, a valve which can be opened and closed with almost no delay from the open/close command is used.

Although an example in which the first valve 21 and the second valve 22 are closed at the start of the flow rate measurement has been described above, the present invention is not limited thereto. In other embodiments, such as when the flow rate measurement is performed from a state where the flow rate-controlled gas is flowing, the flow rate measurement may be started from a state where the first valve 21 and the second valve 22 are opened (after time t1).

Next, at time t2, the first valve 21 and the second valve 22 are simultaneously closed from the state where the gas is flowing through the third flow path L3 at the set flow rate. As disclosed in the PCT/JP2018/4325 filed by the same applicant of the present application, this is to measure the gas quantity or gas pressure in a state where the gas is not flowing (gas sealed state), and to correct the measured flow rate obtained by the build-up method. By performing such correction, the line dependency of the measurement error can be reduced, the actual gas flow rate flowing in at the time of build-up can be more accurately obtained, and more accurate flow rate measurement can be performed.

In order to obtain the gas seal state, typically, a close command is issued to the first valve 21 and the second valve 22 at the same time. However, the second valve 22 is actually closed with a delay, and is closed at time t2' which is a delayed time by a from time t2.

Therefore, in the comparative example shown in FIG. 3, the actual pressure transition X2 (graph shown by a solid line) deviates from the ideal pressure transition X1 (graph shown by a broken line) when the first valve 21 and the second valve 22 are simultaneously closed, and the sealed pressure $P_B$ measured by the pressure sensor 23 becomes a lower value. This is because that gas flows out even after the first valve 21 is closed due to the delayed closing of the second valve 22, so the pressure $P_B$ in the gas sealed state thereafter drops. Note that the temperature $T_B$ measured by the temperature sensor 24 in the gas-sealed state may also deviate from the ideal measured temperature due to the operation delay of the second valve 22.

On the other hand, in the embodiment shown in FIG. 4, when a close command is issued at the time t2, the actual closing of the second valve 22 is detected on the basis of the output signal of the open/close detector 26, and the timing of the close command to the first valve 21 is adjusted on the basis of the detected closed state. More specifically, in the present embodiment, since the responsiveness of the first valve 21 is high, when the open/close detector 26 detects the closed state of the second valve 22, a close command is output to the first valve 21. In this manner, even when the responsiveness of the second valve 22 is low, both of the first valve 21 and the second valve 22 can be closed substantially simultaneously by synchronizing the close timings of the first valve 21 and the second valve 22. Therefore, the actual pressure transition X2 shown by the solid line in FIG. 4 becomes the same as the ideal pressure transition, and the sealed pressure $P_B$ can be measured with high accuracy.

In the above description, a mode in which the open/close detector 26 outputs a close command to the first valve 21 when detecting the closed state of the second valve 22 has been described, but the present invention is not limited thereto. For example, when the open/close detector 26 can continuously detect the open/close degree of the second valve 22, a close command may be output to the first valve 21 when a closed state immediately before the second valve 22 is detected. This makes it possible to synchronize the timing at which the first valve 21 and the second valve 22 close even when the first valve 21 closes slightly later than the close command. The timing of issuing the close command to the first valve 21 can be arbitrarily adjusted in consideration of the responsiveness of the first valve 21 and the second valve 22.

As described above, after the pressure and the temperature $(P_B, T_B)$ in the sealed state at the set flow rate are measured, as shown in FIGS. 3 and 4, the first valve 21 and the second valve 22 are opened, and a steady-state flow state is established in which the gas flows at the set flow rate through the third flow path L3 and the flow rate measuring device 30 again.

Thereafter, at time t4, a close command is issued to only the second valve 22 while maintaining the open state of the first valve 21. As a result, the gas accumulates in the build-up capacity, and the pressure P inside the build-up capacity rises. Then, when the pressure P measured by the pressure sensor 23 reaches the predetermined pressure $P_A$, it is determined that the build-up is completed, and the first valve 21 is also closed to be in a sealed state after the gas inflow. The predetermined pressure $P_A$ can be arbitrarily set in advance based on the volume of the build-up capacity, the set flow rate, and the like. Further, the timing of closing the first valve 21, i.e., the build-up end timing, may be the point of time when a predetermined time set in advance has elapsed since the second valve 22 was closed.

After the first valve 21 is closed and sealed, the raised pressure and temperature ($P_A$, $T_A$) are measured using the pressure sensor 23 and the temperature sensor 24. It is sometimes desirable to measure the pressure $P_A$ and the temperature $T_A$ in a state where the gas inflow is stopped in a sealed state after the build-up. This is because that, the temperature may temporarily increase immediately after the first valve 21 is closed, due to the influence of adiabatic compression. Therefore, the pressure $P_A$ and the temperature $T_A$ after the build-up may be measured in the gas stable state after a predetermined time has elapsed since the first valve 21 was closed.

In the build-up method, it is configured so as the pressure rise in the flow path after the closing of the second valve 22 is measured using the pressure sensor 23. Further, the build-up time (pressure rise time) $\Delta t$ is obtained in order to obtain the gas inflow amount per unit time (i.e., the flow rate), and the flow rate is calculated accordingly.

More specifically, in the flow rate measuring method of the present embodiment, the number of moles $n_A$ of the gas after the build-up is obtained from $n_A = P_A V_s / RT_A$, the number of moles $n_B$ of the gas in the sealed state is obtained from $n_B = P_B V_s / RT_B$, and the number of moles $\Delta n = n_A - n_B = (P_A V_s / RT_A) - (P_B V_s / RT_B) = V_s/R \cdot (P_A/T_A - P_B/T_B)$ of the gas that is considered to have actually flowed in the sealed state is obtained. Here, $P_A$ and $T_A$ are pressure and temperature at a time t5 when the first valve 21 is closed after the build-up and the gas inflow is stopped (or a time when a predetermined time has elapsed while maintaining the sealed state after the time t5), $P_B$ and $T_B$ are pressure and temperature in the sealed state after the first valve 21 and the second valve 22 are simultaneously closed at the time t2. R is the gas constant, and Vs is the volume of the build-up capacity.

Since the flow rate Q is the volume of the gas flowing in per unit time, the gas flow rate Q (sccm) can be obtained from $Q = 22.4 \cdot \Delta n / \Delta t = 22.4 \cdot V_s \cdot (P_A/T_A - P_B/T_B)/(R \cdot \Delta t)$. Here, $\Delta t$ is a build-up time from the start of the build-up by closing the second valve 22 to the stop of the inflow of gas by closing the first valve 21. The build-up time $\Delta t$ is set to, for example, 2 to 20 seconds.

Here, in the comparative example shown in FIG. 3, since the actual close time t4' of the second valve 22 is not measured, the build-up time is measured from the time t4 at which the close command is issued to the second valve 22 to the time t5' at which the pressure P reaches the pressure $P_A$ and the first valve 21 is closed. Therefore, even though the actual pressure transition X2 is deviated from the ideal pressure transition X1, $\Delta t + \alpha (= t5' - t4)$ obtained by adding the delay amount a to the original build-up time $\Delta t (= t5 - t4)$ is used as the build-up time. As a result, the accuracy of the flow measurement may be reduced.

On the other hand, in the embodiment shown in FIG. 4, the time t4' at which the second valve 22 is actually closed can be detected using the open/close detector 26. Therefore, a more accurate build-up time $\Delta t = t5' - t4'$ can be detected as the build-up time. Therefore, the accuracy of the flow rate measurement can be improved.

In this manner, after the flow rate measurement by the build-up method is completed at time t6 when the first valve 21 and the second valve 22 are in opened state, and the gas flows out again at the same time, the gas pressure in the sealed space drops to the pressure at the time of steady gas flow.

As described above, in the present embodiment, since the pressure $P_B$ in the sealed state from the steady flow and the build-up time $\Delta t$ can be detected with higher accuracy using the open/close detector 26, the measurement accuracy can be improved.

As in the fluid control system 1 shown in FIG. 1, when the flow path on the downstream side of the flow rate controller 10 is used as the build-up capacity 20, it may be preferable that the volume Vs of the build-up capacity 20 is obtained by measurement after the flow rate controller 10 is connected to construct the fluid control system 1. The volume Vs of the build-up capacity 20 can be obtained based on $Qs = (\Delta P / \Delta t) \times (V_s / RT)$, for example, by measuring the change rate of the pressure after the second valve 22 is closed in a state where the gas is flowing through the build-up capacity 20 at the set flow rate Qs. The volume Vs of the build-up capacity 20 can be measured by various conventional methods. In this manner, even when $\Delta P / \Delta t$ is obtained to measure the volume Vs of the build-up capacity 20, the fluid control system 1 of the present embodiment can detect the time point at which the second valve 22 is closed using the open/close detector 26, and determine the starting point of the pressure rise accordingly, so that $\Delta t$ can be measured more accurately, and the volume Vs of the build-up capacity can be obtained with improved accuracy. When obtaining the volume Vs of the build-up capacity, by performing measurement at a specific flow rate setting in which an error from the reference value is reduced, the volume Vs can also be obtained more accurately.

In the above description, an embodiment has been described in which the step (second step) of measuring the pressure $P_B$ and the temperature $T_B$ after the first valve 21 and the second valve 22 are simultaneously closed at the time t2 is followed by the step (first step) of measuring the pressure $P_A$ and the temperature $T_A$ of the gas after the build-up, but the order of performing the first step and the second step may be reversed. However, in the first step and the second step, it is preferable that the pressure corresponding to the set flow rate at the starting time (start pressure Px) is the same.

After the first step and the second step are performed, the flow rate can be calculated using the measured pressure $P_A$ and the temperature $T_A$ obtained in the first step, and the measured pressure $P_B$ and the temperature $T_B$ obtained in the second step. The flow rate measured in this manner may be used for comparison verification with the flow rate setting of the flow rate controller 10, and calibration of the flow rate setting of an arbitrary flow rate controller 10 may be performed based on the flow rate obtained by the build-up method described above.

While embodiments of the present invention have been described above, various modifications are possible. For example, as the second step, the pressure and the temperature are measured when the first valve 21 and the second valve 22 are closed simultaneously or substantially simultaneously from the gas flowing state to the sealed state, but the rising pressure and temperature may be measured after closing the first valve 21 following a predetermined time $\Delta t'$ has elapsed from the closing of the second valve 22.

However, the predetermined time $\Delta t'$ in the second step is set to be shorter than the build-up time $\Delta t$ in the first step, and is set to be, for example, at a half or less time. In the flow rate calculation, $\Delta n = n - n'$ is obtained by subtracting the gas amount n' obtained in the second step from the gas amount n obtained in the first step, and the flow rate can be obtained by calculation with the inflow time being $\Delta t - \Delta t'$. At this time as well, the flow rate measurement can be performed with improved accuracy by determining the pressure rise time or the like based on the actual close time of the second valve 22 detected using the open/close detector 26.

INDUSTRIAL APPLICABILITY

According to the fluid control system according to the embodiment of the present invention, the flow rate measurement can be performed with improved accuracy.

DESCRIPTION OF NUMERICALS

1 Fluid control system
2 Process chamber
3 Vacuum pump
4 Gas supply source
10 Flow rate controller
11 Restriction part
12 Pressure sensor
13 Temperature sensor
14 Control valve
16 Control circuit
20 Build-up capacity
21 First valve
22 Second valve
23 Pressure sensor
24 Temperature sensor
25 Controller
26 Open/close detector
30 Flow rate measuring device

The invention claimed is:

1. A fluid control system comprising:
a first valve provided downstream of a flow rate controller;
a flow rate measuring device provided downstream of the first valve, the flow rate measuring device having a second valve;
an open/close detector provided to the second valve, the open/close detector including at least one of a position sensor for detecting a movement of a valve element of the second valve, a displacement meter for measuring a position of a piston of the second valve, and a limit switch for detecting a vertical movement of a stem of the second valve; and
a controller for controlling the open/close operation of the first valve and the second valve,
wherein the open/close operation of the first valve is controlled according to an output signal of the open/close detector, and
the flow rate measuring device further comprises a pressure sensor disposed upstream of the second valve, and the pressure sensor is configured to measure a pressure rise in a flow path after the second valve is closed, and a start point of the pressure rise is determined based on the signal output from the open/close detector.

2. The fluid control system according to claim 1, wherein the controller controls a timing of an open/close command output to the first valve according to the opening/closing state of the second valve determined by the signal output from the open/close detector.

3. A fluid control system according to claim 1, comprising:
a plurality of the flow rate controller, a plurality of the first valve, and a plurality of first flow paths each having a corresponding one of the plurality of the flow rate controller and a corresponding one of the plurality of the first valve;
a second flow path connected in common to the downstream side of the plurality of first flow paths, and for supplying a fluid whose flow rate is controlled by the flow rate controller to a consumption part; and
a third flow path branching from the second flow path and having the flow rate measuring device.

4. The fluid control system according to claim 1, wherein the flow rate controller is a pressure-type flow rate controller comprising a control valve, a restriction part, and an upstream pressure sensor for measuring a pressure upstream of the restriction part.

5. A flow rate measuring method performed in a fluid control system including: a first valve provided downstream of a flow rate controller; a flow rate measuring device provided downstream of the first valve, the flow rate measuring device having a pressure sensor, a temperature sensor, and a second valve; an open/close detector provided to the second valve, the open/close detector including at least one of a position sensor for detecting a movement of a valve element of the second valve, a displacement meter for measuring a position of a piston of the second valve, and a limit switch for detecting a vertical movement of a stem of the second valve; and a controller for controlling an open/close operation of the first valve and the second valve,
the method comprising:
a first step of closing the second valve in a state where the gas is flowing by opening the first valve and the second valve to flow a gas, closing the first valve after a build-up time period has elapsed from the closing of the second valve, and measuring pressure and temperature after the closing the first valve using the pressure sensor and the temperature sensor;
a second step of simultaneously closing the first valve and the second valve in a state where gas is flowing by opening the first valve and the second valve to flow a gas, and measuring pressure and temperature after closing the first valve and the second valve using the pressure sensor and the temperature sensor, and
a third step of calculating flow rate based on the pressure and the temperature measured in the first step and the pressure and the temperature measured in the second step,
wherein in the first step, a time point at which the second valve is closed is determined based on an output from the open/close detector, and
a timing of an open/close command output to the first valve is controlled in accordance with a signal output from the open/close detector when the operation of simultaneously closing the first valve and the second valve is performed in the second step.

6. The flow rate measuring method according to claim 5, wherein the third step comprises calculating a flow rate Q according to $Q=22.4 \cdot V_s \cdot (P_A/T_A - P_B/T_B)/(R \cdot \Delta t)$, where $V_s$ is a build-up volume, R is a gas constant, $\Delta t$ is the build-up time period from closing the second valve to closing the first valve in the first step, $P_A$ and $T_A$ are the pressure and the temperature measured in the first step, and $P_B$ and $T_B$ are the pressure and temperature measured in the second step.

* * * * *